June 16, 1953     D. BUCCICONE     2,642,174
MAGNETIC RAIL CONVEYER
Filed April 13, 1951     2 Sheets-Sheet 1
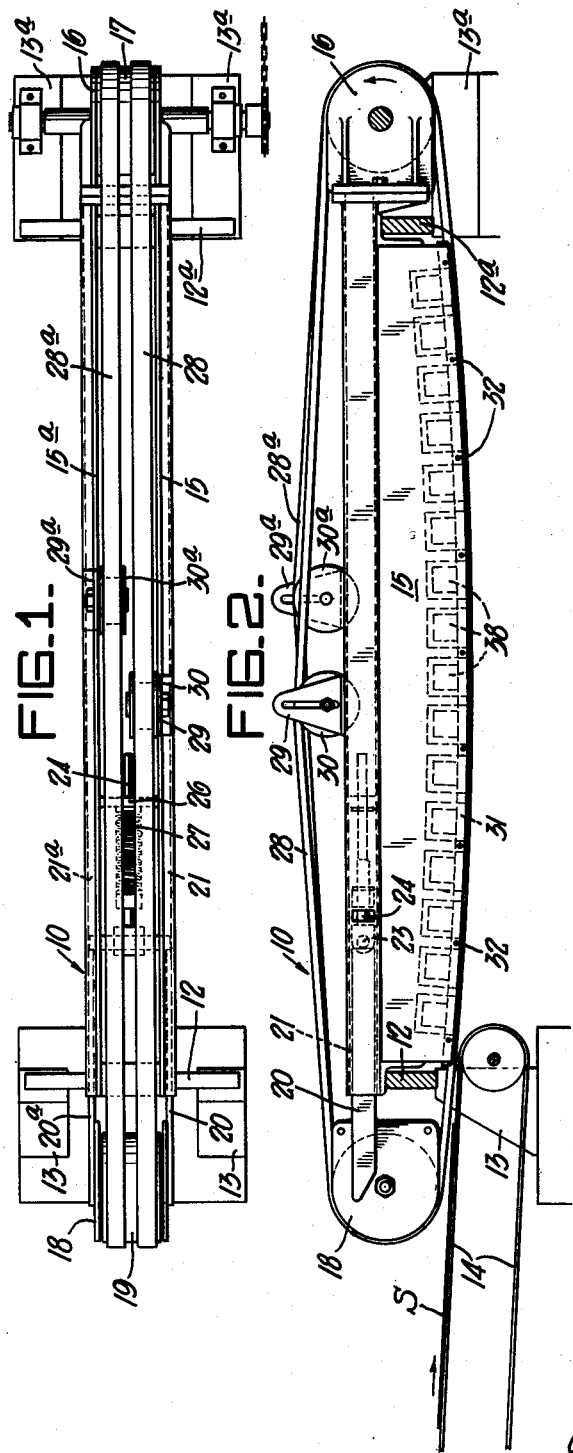
Inventor:
DARIO BUCCICONE,
by: Donald G. Dalton
his Attorney

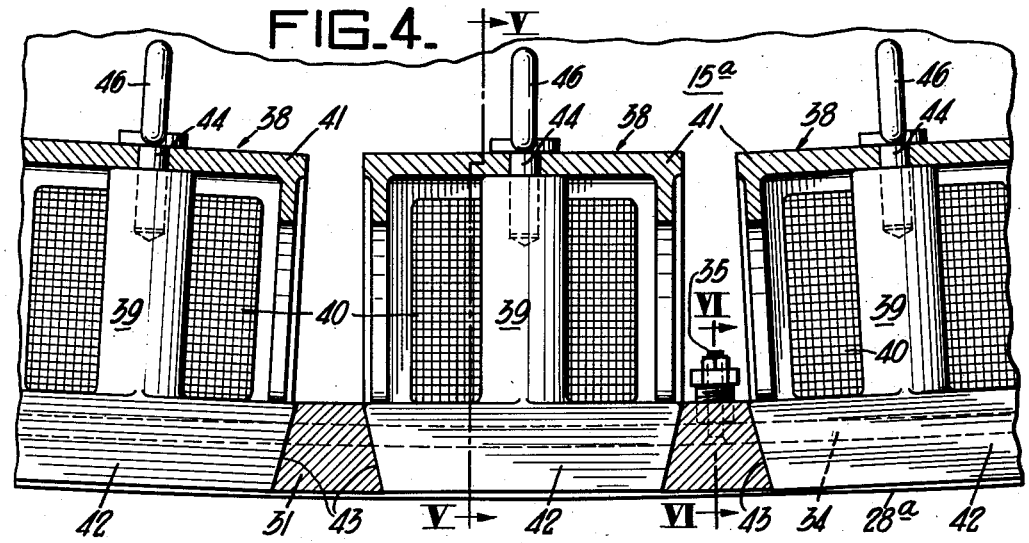
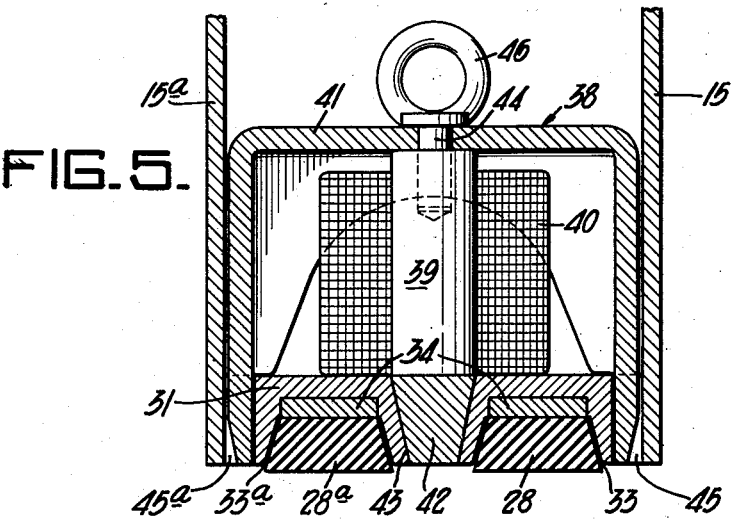
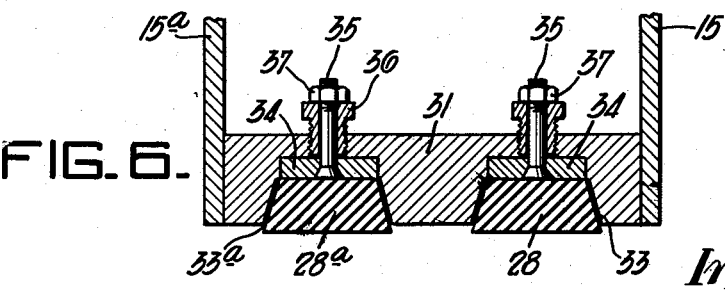

Patented June 16, 1953

2,642,174

UNITED STATES PATENT OFFICE 2,642,174

MAGNETIC RAIL CONVEYER

Dario Buccicone, Gary, Ind.

Application April 13, 1951, Serial No. 220,937

6 Claims. (Cl. 198—41)

This invention relates to improvements in magnetic rail conveyors, such as are embodied in sheet pilers of the type shown in my earlier Patents No. 2,374,174, dated April 24, 1945, No. 2,486,733, dated November 1, 1949, and No. 2,527,911, dated October 31, 1950.

An object of the invention is to provide magnetic rail conveyors in which the magnets are of an improved construction that furnishes a more uniform undistorted field spread across the width of the rail.

A further object is to provide magnetic rail conveyors of an improved construction which enables individual magnets to be removed and replaced without otherwise dismantling the conveyor.

A further object is to provide magnetic rail conveyors which embody means for adjusting the distance the belts extend below the magnets and thereby adjusting the spacing between articles carried by the conveyor and the magnets.

In accomplishing these and other objects of the invention, I have provided improved details of structure, a preferred form of which is shown in the accompanying drawings, in which:

Figure 1 is a top plan view of a magnetic rail conveyor which embodies features of the present invention;

Figure 2 is a side elevational view of the conveyor;

Figure 3 is a horizontal sectional view;

Figure 4 is a longitudinal vertical sectional view; and

Figures 5 and 6 are vertical cross sectional views taken substantially on lines V—V and VI—VI of Figure 4.

Figures 1 and 2 show a magnetic rail conveyor 10 which, except for the features of improvement hereinafter pointed out, is like that shown in my aforesaid Patent No. 2,527,911 and is adapted to pile sheets according to the method disclosed and claimed in said patent. One or more such conveyors are supported side-by-side. The support means can be as shown in said patent, but I now prefer to employ cross bars 12 and 12a, which in turn are supported on stands 13 and 13a. For simplicity only one conveyor 10 is shown, but it is apparent that the cross bars 12 and 12a can be of any desired length and can support any desired number of conveyors 10. The number actually used of course depends on the sheet width. A belt conveyor 14 feeds sheets S to the left end of conveyor 10, which then carries them magnetically on its underside to the right and piles them in the fashion disclosed in said patent.

Conveyor 10 comprises side plates 15 and 15a of non-magnetic material, such as brass, and the lower edges of which preferably are curved also as shown in said patent. A housing 16 is fixed to the right end of these side plates and contains a power driven sheave 17. A housing 18 is adjustably mounted on the left end of the side plates and contains an idler sheave 19. The preferred mounting means for the housing 18 includes a pair of bars 20 and 20a which are fixed to the sides of the housing and are slidably received in passages 21 and 21a formed along the upper edges of side walls 15 and 15a. The inner walls of said passages contain slots 22 and 22a. A pin 23 rides in said slots and carries a screw-threaded spindle 24, which has a nut 25 threadedly engaged therewith. A crosspiece 26 is rigidly connected between side plates 15 and 15a. A compression spring 27 bears between nut 25 and crosspiece 26 and thereby forces the housing 18 and sheave 19 outwardly. Compression in said spring can be varied by adjusting the position of nut 25 on spindle 24.

A pair of belts 28 and 28a extends around sheaves 17 and 19. Side plates 15 and 15a preferably have upstanding brackets 29 and 29a respectively, which carry vertically adjustable idler pulleys 30 and 30a. Belts 28 and 28a pass around these pulleys which are adjusted to compensate for variations in belt lengths. Compression in spring 27 keeps the belts taut.

In accordance with the present invention, a unitary bottom member 31 is fixed between the lower edges of side plates 15 and 15a. Said bottom member is of non-magnetic material, such as brass, and is held in place by a plurality of bolts 32. The underside of the bottom member contains a pair of parallel longitudinal grooves 33 and 33a. Each of said grooves houses a wear strip 34, also of non-magnetic material such as brass (Figures 5 and 6). Strip 34 carries a number of screw-threaded studs 35 which project upwardly and are loosely received in bushings 36. Said bushings are threadedly engaged in apertures through the bottom member 31. Nuts 37 are threadedly engaged with studs 35 above said bushings. Belts 28 and 28a ride within grooves 33 and 33a respectively against the wear strips 34 and project slightly below the bottom member. This distance of projection can be adjusted by adjusting the bushings 36 and nuts 37.

The magnetic rail 10 further comprises a plurality of electromagnets 38, each of which includes a core 39, windings 40 and a housing 41, both the core and the housing being of magnetic material Figures 4 and 5). In accordance with the present invention, each core 39 carries a longitudinally elongated integral pole piece 42, which tapers downwardly and is received in a corresponding downwardly tapered aperture 43 in the bottom member 31. These apertures form a series located along the center line of the bottom member. Each housing 41 is U-shaped in cross section and is attached to the top of its core by a bolt 44. The lower portions of the side walls of each housing 41 are received in cut-outs 45 and 45a in the edges of the bottom member 31. In each magnet the lower faces of these side walls and of pole pieces 42 are in the same plane and furnish magnetic poles of opposite polarity. The top of each housing preferably carries an eyelet 46 for convenience in lifting the magnets. The magnets are supported by engagement of their pole pieces 42 with slots 43 in the bottom member and can be removed for replacement, repair or inspection merely by lifting them out, without otherwise dismantling the conveyor.

The energizing circuit for the magnets can be identical with that fully disclosed in my aforesaid Patent No. 2,527,911, and therefore its disclosure is not repeated here. The operation and method of piling also are similar and are not repeated. I find that the integral pole piece construction furnishes a more uniform undistorted field than is possible with the separate construction shown in said patent. Adjustment of bushings 36 and nuts 37 controls the spacing between the bottom faces of the belts 28 and 28a and the bottom faces of the magnetic poles, and thus controls the spacing between the tops of sheets S and the poles. This adjustability in cooperation with the improved magnet construction furnishes better control of the lifting and dropping of the sheets. The ready removability of the magnets greatly simplifies assembly, maintenance and repair.

While I have shown and described only a single embodiment of the invention, it is apparent that modifications may arise. Therefore, I do not wish to be limited to the disclosure set forth but only by the scope of the appended claims.

I claim:

1. A magnetic rail conveyor comprising a pair of side plates, a power driven sheave and an idler sheave rotatably mounted at opposite ends of said side plates, a bottom member fixed between the lower edges of said side plates and containing a pair of longitudinal grooves in its underside, wear strips housed in said grooves, fastening means adjustably fixing said wear strips to said bottom member, a pair of belts surrounding said sheaves and received in said grooves and riding against said wear strips, said bottom member having downwardly tapered apertures along its center line and cut-outs in its edges and a plurality of electromagnets having integral elongated pole pieces received in said apertures and housings extending into said cut-outs, said magnets being removable by lifting them from the bottom member without otherwise dismantling the conveyor, adjustment of said fastening means controlling the spacing between the underfaces of said belts and said pole pieces.

2. A magnetic rail conveyor comprising a pair of side plates, of non-magnetic material, a power driven sheave and an idler sheave rotatably mounted at opposite ends of said side plates, a unitary bottom member of non-magnetic material fixed between the lower edges of said side plates and containing a pair of longitudinal grooves in its underside, wear strips of non-magnetic material housed in said grooves, fastening means adjustably fixing said wear strips to said bottom member, a pair of belts surrounding said sheaves and received in said grooves and riding against said wear strips, said bottom member having downwardly tapered apertures along its center line and cut-outs in its edges, and a plurality of electromagnets having integral elongated downwardly tapered pole pieces received in said apertures and housings extending into said cut-outs, the underfaces of said pole pieces and said housings of each magnet being in the same plane and furnishing magnetic poles of opposite polarity, said magnets being removable by lifting them from the bottom member without otherwise dismantling the conveyor, adjustment of said fastening means controlling the spacing between the underfaces of said belts and said magnetic poles.

3. A magnetic rail conveyor comprising a pair of side plates, a power driven sheave and an idler sheave rotatably mounted at opposite ends of said side plates, a bottom member fixed between the lower edges of said side plates and containing a pair of longitudinal grooves in its underface, a pair of belts surrounding said sheaves and riding in said grooves, said bottom member having a series of downwardly tapered apertures along its center line and cut-outs in its edges, and a plurality of electromagnets each of which includes an integral core and an elongated pole piece and a housing fastened to the top of its core, said pole pieces being received in said apertures and the lower ends of said housing being received in said cut-outs, said magnets being removable by lifting them from the bottom member without otherwise dismantling the conveyor.

4. A magnetic rail conveyor comprising a pair of side plates of non-magnetic material, a power driven sheave and an idler sheave rotatably mounted at opposite ends of said side plates, a unitary bottom member of non-magnetic material fixed between the lower edges of said side plates and containing a pair of longitudinal grooves in its underface, wear strips of non-magnetic material housed in said grooves, a pair of belts surrounding said sheaves and received in said grooves and riding against said wear strips, said bottom member having a series of downwardly tapered apertures along its center line and cut-outs in its edges, and a plurality of electromagnets, each of which includes an integral core and an elongated downwardly tapered pole piece, windings around said core, and a housing of magnetic material of U-shaped cross-section bolted to the top of said core, said pole pieces being received in said apertures and the lower portions of said housings being received in said cut-outs, the lower faces of the pole piece and housing of each magnet being in the same plane and furnishing magnetic poles of opposite polarity, said magnets being removable by lifting them from the bottom member without otherwise dismantling the conveyor.

5. A magnetic rail conveyor comprising a pair of side plates, a power driven sheave and an idler sheave rotatably mounted at opposite ends of said side plates, a bottom member fixed between the lower edges of said side plates and containing a pair of longitudinal grooves in its underside, wear strips housed in said grooves, fastening means fixing said wear strips to said bottom member, a pair of belts surrounding said sheaves and received in said grooves and riding against said wear strips, and a plurality of electromagnets, each of said electromagnets having a pole located between said belts and a pair of poles which are of polarity opposite said first named pole and are located outside said belts, the poles of each magnet being all in the same plane, said fastening means being adjustable to adjust the vertical distance between the underfaces of said belts and said poles.

6. A magnetic rail conveyor comprising a pair of side plates, a power driven sheave and an idler sheave rotatably mounted at opposite ends of said side plates, a unitary bottom member fixed between the lower edges of said side plates and containing a pair of longitudinal grooves in its underside, wear strips housed in said grooves, upstanding screw-threaded studs fixed to the upper faces of said wear strips, bushings threadedly engaged with said bottom member and receiving said studs, nuts on said studs above said bushings, a pair of belts surrounding said sheaves and received in said grooves and riding against said wear strips, and a plurality of electromagnets, each of said electromagnets having a pole located between said belts and a pair of poles which are of polarity opposite said first named pole and are located outside said belts, the poles of each magnet being all in the same plane, said nuts and said bushings being adjustable to adjust the vertical distance between the underfaces of said belts and said poles.

DARIO BUCCICONE.

References Cited in the file of this patent

UNITED STATES PATENTS

| Number | Name | Date |
|---|---|---|
| 2,340,797 | Cummings | Feb. 1, 1944 |